United States Patent [19]
Cabrera

[11] Patent Number: 6,076,804
[45] Date of Patent: Jun. 20, 2000

[54] HYDRAULIC CONTROLLING VALVE

[76] Inventor: Pedro Cabrera, 1745 SW. 31st Pl., Hialeah, Fla. 33012

[21] Appl. No.: 09/174,208

[22] Filed: Oct. 16, 1998

[51] Int. Cl.$^7$ .................................................. F16K 1/00
[52] U.S. Cl. ..................... 251/320; 137/903; 251/335.2; 251/900; 251/295; 251/244
[58] Field of Search ................... 251/238, 244, 251/295, 320, 321, 335.2, 900; 137/903

[56] References Cited

U.S. PATENT DOCUMENTS

| | | | |
|---|---|---|---|
| 1,184,365 | 5/1916 | Luhrs | 251/239 |
| 3,063,465 | 7/1962 | Oros | 251/244 |
| 3,195,566 | 7/1965 | Cornelius | 251/245 |
| 3,253,788 | 5/1966 | McHugh et al. | 251/321 |
| 4,316,600 | 2/1982 | Parise et al. | 251/245 |
| 5,421,552 | 6/1995 | Wang et al. | 251/295 |

FOREIGN PATENT DOCUMENTS

| | | | |
|---|---|---|---|
| 904712 | 7/1972 | Canada | 251/320 |
| 353230 | 3/1961 | Switzerland | 251/321 |
| 659539 | 6/1949 | United Kingdom | 251/321 |

*Primary Examiner*—Kevin Shaver
*Assistant Examiner*—J P Welsh
*Attorney, Agent, or Firm*—J. Sanchelima

[57] ABSTRACT

A hydraulic valve for controlling the flow of a pressured liquid with a housing that has an inlet and an outlet with a pivotally mounted handle that actuated a valve stem member housed within an internal bore with a counter bore step surface. An O-ring member is mounted on the step surface that comes in contact with a convex surface provided in a peripheral flange member on the stem member. A compressible cylindrical member is trapped partially within an opening at one end of the valve stem member urging the convex surface against the O-ring thus blocking the flow of the pressurized liquid through the internal valve bore.

4 Claims, 3 Drawing Sheets

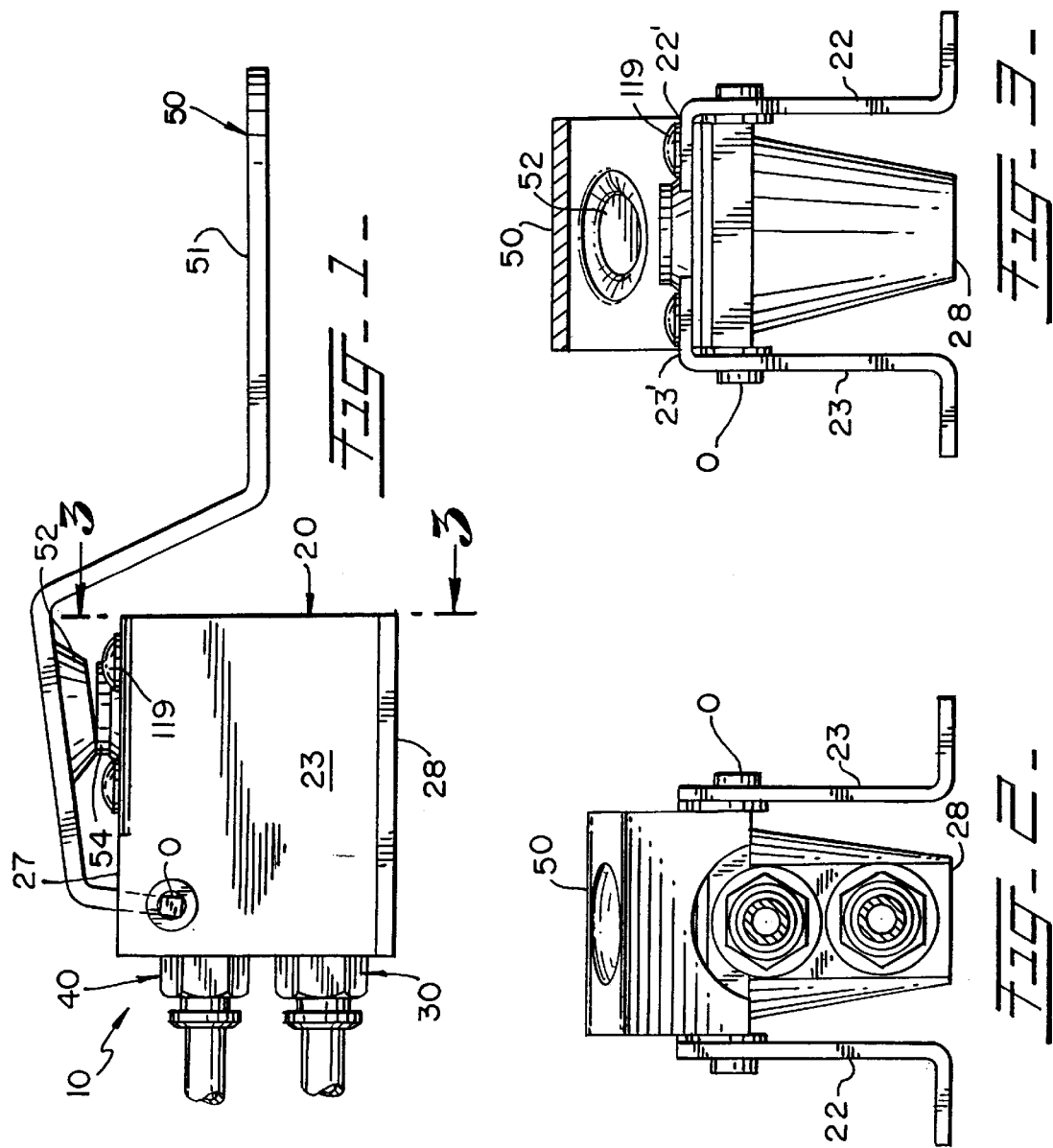

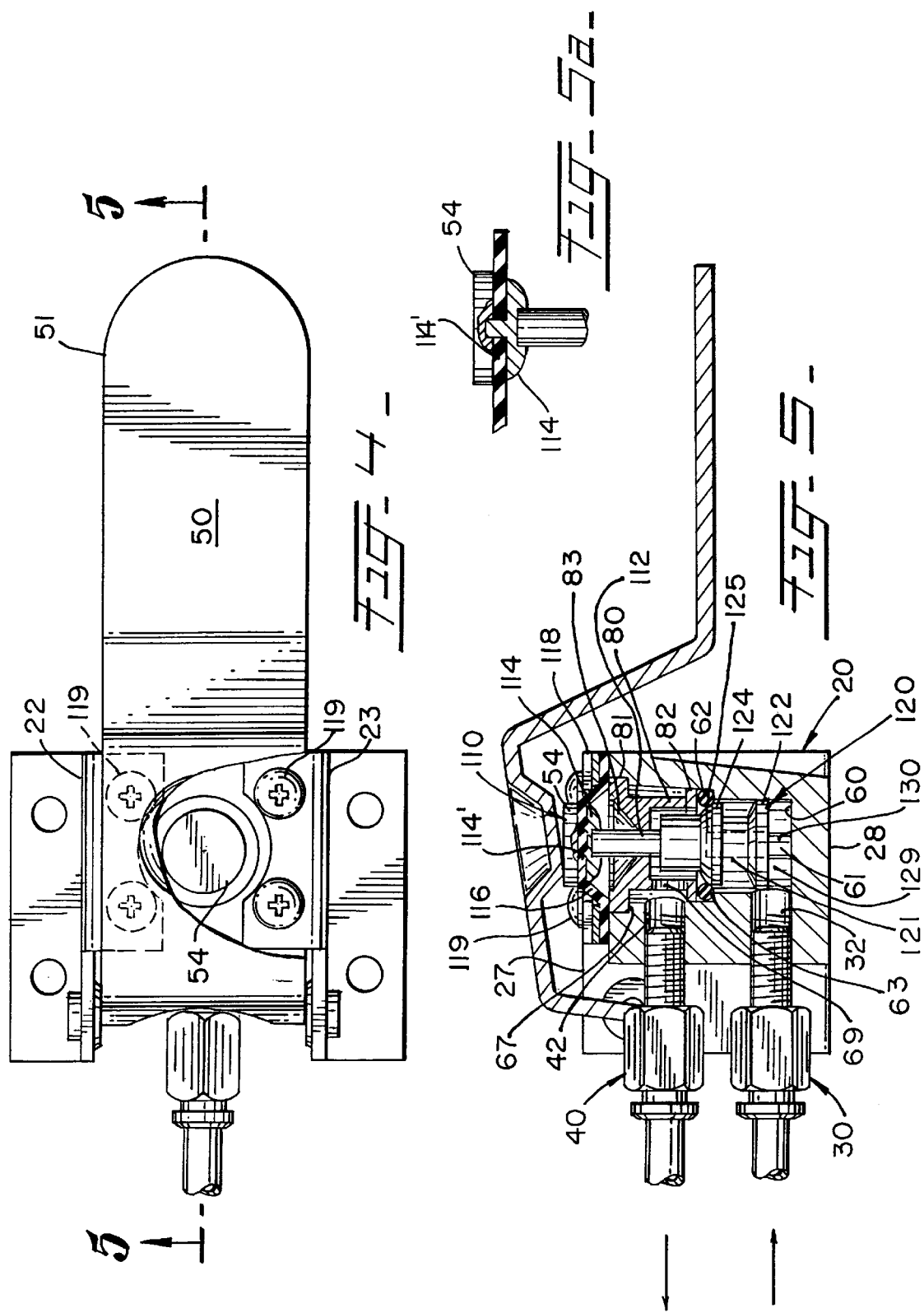

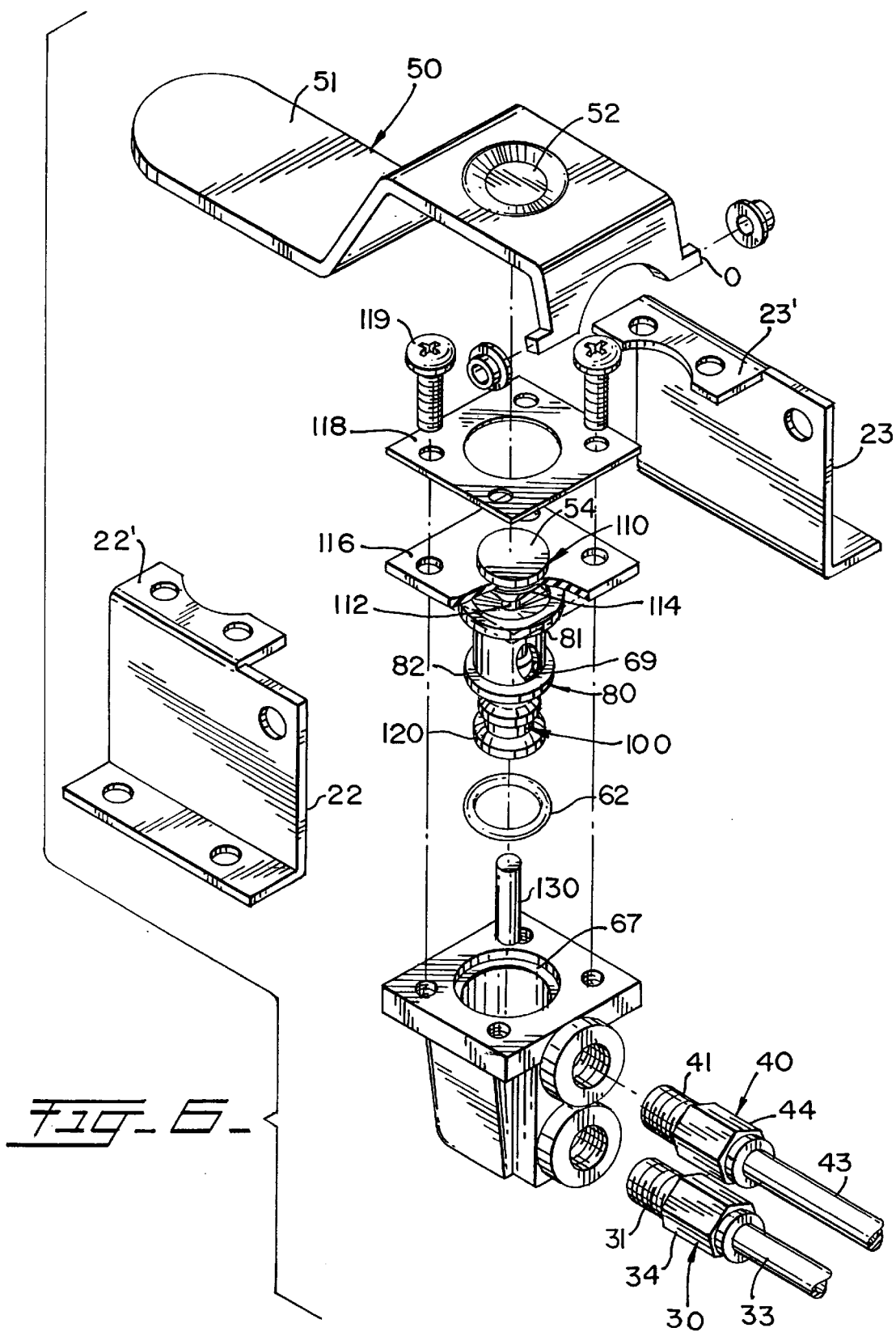

HYDRAULIC CONTROLLING VALVE

BACKGROUND OF THE INVENTION

1. Field of the Invention

The present invention relates to hydraulic valve, and more particularly, to a valve that is installed to a source of pressurized liquid to control its flow.

2. Description of the Related Art

Applicant believes that the closest reference corresponds to U.S. Pat. No. 4,316,600 to Parise at al in 1982 entitled Fast Acting, Non Repairable Plastic ON/OFF Valve. As in the present invention, the patented invention includes two O-rings, one of them acting as a valve seat. However, Parise's O-ring is not trapped in place and when the valve is open it moves around. The valve O-ring in the present invention is kept in place and does not move. The second O-ring in Paris is used to prevent the leakage of water through bore 30. The present invention does not require the use of this second O-ring that is constantly exposed to friction forces. The present invention used a flexible cover that prevents, in a more efficient fashion, the leakage of water. Additionally, the present invention employs a metal coil spring to exert a closing force whereas present invention uses a rubber plug to counter a user's actuating force on the pedal and valve stem. The difficulties experienced with metal coil springs include their deterioration over time when exposed to water and metal feature. Their elastic characteristics are changed.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a valve that is normally closed without leaks and permits a user to readily open it, such as when applying a predetermined force on a pedal.

It is another object of this invention to provide such a valve wherein a predetermined force is applied to open the valve and this predetermined force stays substantially constant over long periods of time.

It is still another object of the present invention to provide a valve that uses a minimum of parts.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is a side elevational view of one of the preferred embodiments.

FIG. 2 is a front view of the device shown in the previous figure.

FIG. 3 is a rear view of the device shown in the previous figure taken along 3—3 in FIG. 1.

FIG. 4 is a top view of the preferred embodiment.

FIG. 5 cross-sectional side view of device shown in FIG. 4, taken along line 5—5.

FIG. 6 is an exploded view of one of the preferred embodiments.

DETAILED DESCRIPTION OF THE PREFERRED EMBODIMENT

Referring now to the drawings, where the present invention is generally referred to with numeral 10, it can be observed that it basically includes housing assembly 20 with inlet and outlet ports 30 and 40. Handle or pedal assembly 50 is pivotally mounted to housing assembly 20. Ports 30 and 40 connect to respective passages 32 and 42 that connect with internal valve bore 60.

Housing 20 includes bracket members 22 and 23 that facilitate rigidly mounting the former to a flat surface as shown in FIGS. 1;2;3 and 4. Pedal assembly 50 pivots at point O over pivoting pins 22' and 23'. Contact pad 52 is mounted to the underside of arm 51 pedal assembly 50, at a predetermined distance from point O and co-acts with actuator 54.

As it can be seen from FIG. 5, internal valve bore 60 starts from upper wall 27 and extends perpendicularly toward opposite bottom wall 28 without reaching it. First counter bore 67 is adjacent to upper wall 27. Passage 32 connects with bore 60 adjacent to bottom 61, in the preferred embodiment. A second counter bore step 63 is positioned above passage 32 and below outlet passage 42 providing the necessary resting surface to receive O-ring 62. The external end of passage 32 is connected to inlet port 30 that includes threaded end 31, nut 34, and conduct 33.

First counter bore step 67 is defined above outlet passage 42 and substantially adjacent to upper wall 27. The external end of passage 42 is connected to outlet port 40 that includes threaded end 41, nut 44, and conduct 43. Step 67 provides a resting surface for upper flange 81 at one end of guiding cylinder assembly 80. Flange 81 extends radially inwardly with a frustroconical counter bore 83 and with a through central opening. Guiding cylinder assembly 80 is housed totally within bore 60 and it includes a lower flange 82 that extends a cooperative distance that trap O-ring 62 in place. Aperture 69 is positioned on the lateral wall of assembly 80 to substantially and cooperatively coincide with passage 42.

Valve assembly 100 is mounted through assembly 80. Assembly 100 includes a stem member that in turn includes upper section 110 and lower section 120 that are brought together in rigid locked relationship to each other. Upper section 110 includes activator head 54, at one end and is followed, along shank 112, by frustroconical disk 114 separated sufficiently receive rubber pad 116. Frustroconical disk 114 is flat on the side closer to head 54. The underside of disk 114 comes in mating contact with frustroconical counter bore 83. In the preferred embodiment, rubber pad 116 includes a stretchable central opening 114' through which activator 54 is forced. Metal plate 118 by tabs 22 and 23 and fasteners 119. The other end of upper section 110 of valve assembly 100 of locked in place within a central opening at one end of lower section 120. The other end of section 120 includes central opening 121 for housing rubber cylinder 130. The lower end 129 of section 120 includes guiding flange 122 that has a cooperative diameter slightly smaller than the inner diameter of bore 60 and intended to help valve assembly 100 generally in a central position. At a predetermined distance towards the center of section 120 is a peripheral flange 124 with upper end lower sides. The upper side has a convex surface 125 that comes in contact with O-ring 62 for closing the passage of liquid through bore 60.

Rubber cylinder 130 is the preferred embodiment provides a reliable compressible elements that requires practically no maintenance. Its compression and extension permits repeatability that could not be obtained with coils, springs or, equivalent components that are subject to fatigue and do not operate well in wet environment.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A valve assembly comprising:

A) housing means having an upper wall and a bottom wall, and an internal valve bore that starts on said upper wall and extends perpendicularly towards said bottom wall without reaching said bottom wall, and said internal valve bore includes a first and second counter bore internal step surfaces defining first, second, and third portions of different diameters with said first portion being adjacent to said upper wall and having a predetermined diameter, said second portion having a smaller diameter than said first portion, and said third portion having a diameter that is smaller than said second portion, and said housing means further including inlet and outlet passages that connect with said third and second portions for said internal valve bore perpendicularly at two points separated a predetermined distance and said inlet being connected to a source of a pressurized liquid;

B) a valve assembly being housed within said internal valve bore, said valve assembly including a cylindrical body with two ends and an aperture that substantially coincides with said outlet passage and an upper flange extending outwardly and inwardly from one of said ends and cooperatively disposed abattingly against said first counter bore internal step surface, and said cylindrical body having a longitudinal through opening and said valve assembly further including a stem assembly having first and second sections locked to each other after being passed through said cylindrical body, said stem assembly having first and second ends corresponding to said first and second sections and said first section includes an activator head that extends beyond said cylindrical body, a shank rigidly extending from said activator head and a disk at a spaced apart relationship with respect to said activator head, and said disk having a diameter larger than said through opening of said cylindrical body, and said second section including a central longitudinal opening and a guiding disk positioned at said second end for keeping said valve assembly centrally disposed within said valve bore and further including a peripheral flange at a spaced apart relationship with respect to said guiding disk and closer to the longitudinal center of said second section, said peripheral flange including upper and lower sides;

C) an O-ring mounted on said second counter bore internal step surface and said O-ring member having an external diameter slightly larger than the internal diameter of said second section so that said O-ring member is pressure fitted thereon, and the inner diameter of said O-ring being slightly smaller than the diameter of said third section so that said O-ring member protrudes slightly inwardly to prevent said convex surface from passing to said first portion and thus actings as the valve seat;

D) an elastic cylindrical member having compression characteristics that permit the recuperation of its at rest longitudinal dimension upon the removal of a compression force, and said cylindrical member being partially inserted in said central longitudinal opening urging said convex surface against said O-ring; and E) a handle member pivotally mounted to said housing means and having a contact protrusion at a cooperative position that brings said protrusion in contact with said activator head so that when a torque is applied to said handle member and transmitted through said protrusion to said activator head, the lower section of said valve assembly is forced downwardly compressioning said elastic cylindrical member thereby permitting said fluid to flow from said inlet passage through said internal valve bore and to said outlet passage.

2. The valve assembly set forth in claim 1 further including a rubber pad with a central opening through which said upper section passes exposing said activator head to said protrusion, and including a plate sandwiching said rubber pad with said upper wall, and further including means for fastening said plate member to said housing means.

3. The valve assembly set forth in claim 2 wherein said upper side has a convex surface.

4. The valve set forth in claim 3 wherein said elastic cylindrical member is made out of rubber.

* * * * *